(12) United States Patent
Tong

(10) Patent No.: US 8,223,519 B2
(45) Date of Patent: Jul. 17, 2012

(54) POWER CONTROL SYSTEM

(75) Inventor: Song-Lin Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 214 days.

(21) Appl. No.: 12/796,539

(22) Filed: Jun. 8, 2010

(65) Prior Publication Data
US 2011/0267860 A1 Nov. 3, 2011

(30) Foreign Application Priority Data
Apr. 28, 2010 (CN) .......................... 2010 1 0158839

(51) Int. Cl.
*H02M 5/42* (2006.01)
*G05F 1/40* (2006.01)
(52) U.S. Cl. .......................... 363/81; 323/285; 323/225
(58) Field of Classification Search ................. 323/222, 323/224, 225, 282, 284, 285, 351; 363/79, 363/81, 125
See application file for complete search history.

(56) References Cited

U.S. PATENT DOCUMENTS

| | | | |
|---|---|---|---|
| 4,974,141 A * | 11/1990 | Severinsky et al. | 363/81 |
| 6,577,072 B2 * | 6/2003 | Saito et al. | 315/185 R |
| 7,808,219 B2 * | 10/2010 | Ye et al. | 323/224 |
| 7,936,157 B2 * | 5/2011 | Kashima | 323/282 |
| 2007/0212103 A1* | 9/2007 | Kikuchi | 399/88 |
| 2008/0316781 A1* | 12/2008 | Liu | 363/80 |
| 2011/0221373 A1* | 9/2011 | Tong et al. | 318/490 |
| 2011/0234192 A1* | 9/2011 | Tong | 323/311 |

* cited by examiner

*Primary Examiner* — Jessica Han
(74) *Attorney, Agent, or Firm* — Altis Law Group, Inc.

(57) ABSTRACT

A power control system includes a rectifier circuit, a buck circuit, a voltage divider circuit, a control circuit, and a switch circuit. A first terminal of the rectifier circuit is connected to an alternating current (AC) power supply. A second terminal of the rectifier circuit is connected to a first terminal of the buck circuit and a first terminal of the voltage divider circuit. A first terminal of the control circuit is connected to a second terminal of the buck circuit. A second terminal of the control circuit is connected to a second terminal of the voltage divider circuit. A third terminal of the control circuit is connected to the switch circuit. The switch circuit is connected to the AC power supply and an electronic device.

8 Claims, 3 Drawing Sheets

POWER CONTROL SYSTEM

BACKGROUND

1. Technical Field

The present disclosure relates to a power control system.

2. Description of Related Art

When a user connects an electronic device to an alternating current (AC) power source without knowing or checking the voltage of the AC power source, the electronic device may not work or be damaged if it is connected to a power source having a lower or higher voltage rating than the electronic device. Therefore there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements is illustrated by way of examples and not by way of limitation. It should be noted that references to "an" or "one" embodiment in this disclosure are not necessarily to the same embodiment, and such references mean at least one.

Figure 1:
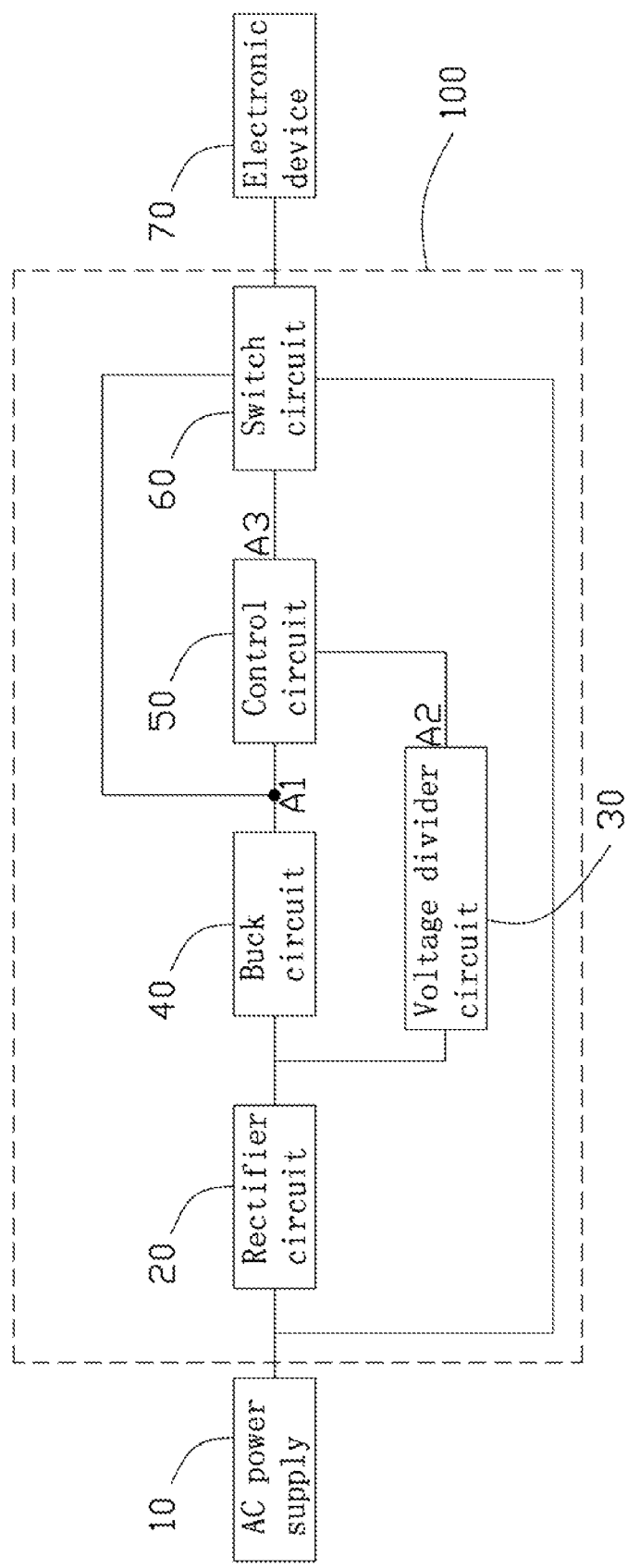
FIG. 1 is a schematic block diagram of an exemplary embodiment of a power control system, connected between an electronic device and an alternating current (AC) power supply, the power control system includes a control circuit and a switch circuit.

Referring to FIG. 1, an exemplary embodiment of a power control system 100 is used to detect whether a voltage of an alternating current (AC) power supply 10 matches a voltage rating of an electronic device 70. The power control system 100 connects the AC power supply 10 to the electronic device 70 when the voltage of the AC power supply 10 matches the voltage rating of the electronic device 70.

The power control system 100 includes a rectifier circuit 20, a voltage divider circuit 30, a buck circuit 40, a control circuit 50, and a switch circuit 60.

A first terminal of the rectifier circuit 20 is connected to the AC power supply 10. In the embodiment, the rectifier circuit 20 is a bridge type rectifier circuit.

A first terminal of the buck circuit 40 is connected to a second terminal of the rectifier circuit 20. In the embodiment, the buck circuit 40 is well known to those of ordinary skill in the art.

A first terminal of the voltage divider circuit 30 is connected to the second terminal of the rectifier circuit 20. In the embodiment, the voltage divider circuit 30 is well known to those of ordinary skill in the art.

A first terminal of the control circuit 50 is connected to a second terminal A1 of the buck circuit 40. A second terminal of the control circuit 50 is connected to a second terminal A2 of the voltage divider circuit 30. A third terminal of the control circuit 50 is connected to a first terminal A3 of the switch circuit 60.

A second terminal of the switch circuit 60 is connected to the AC power supply 10. A third terminal of the switch circuit 60 is connected to the electronic device 70. A fourth terminal of the switch circuit 60 is connected to the second terminal of the buck circuit 40.

The rectifier circuit 20 converts an AC voltage of the AC power supply 10 to a first direct current (DC) voltage. The buck circuit 40 receives the first DC voltage and outputs a second DC voltage. The voltage of the second DC voltage is less than the voltage of the first DC voltage. The second DC voltage supplies power to the control circuit 50 and the switch circuit 60.

The control circuit 50 detects the voltage of the first DC voltage via the voltage divider circuit 30. The control circuit 50 compares the voltage of the first DC voltage and a standard voltage, and outputs a control signal to the switch circuit 60 according to a compared result. The control circuit 50 controls the switch circuit 60 to connect or disconnect the AC power supply 10 to or from the electronic device 70 according to the control signal of the control circuit 50.

Figure 2:
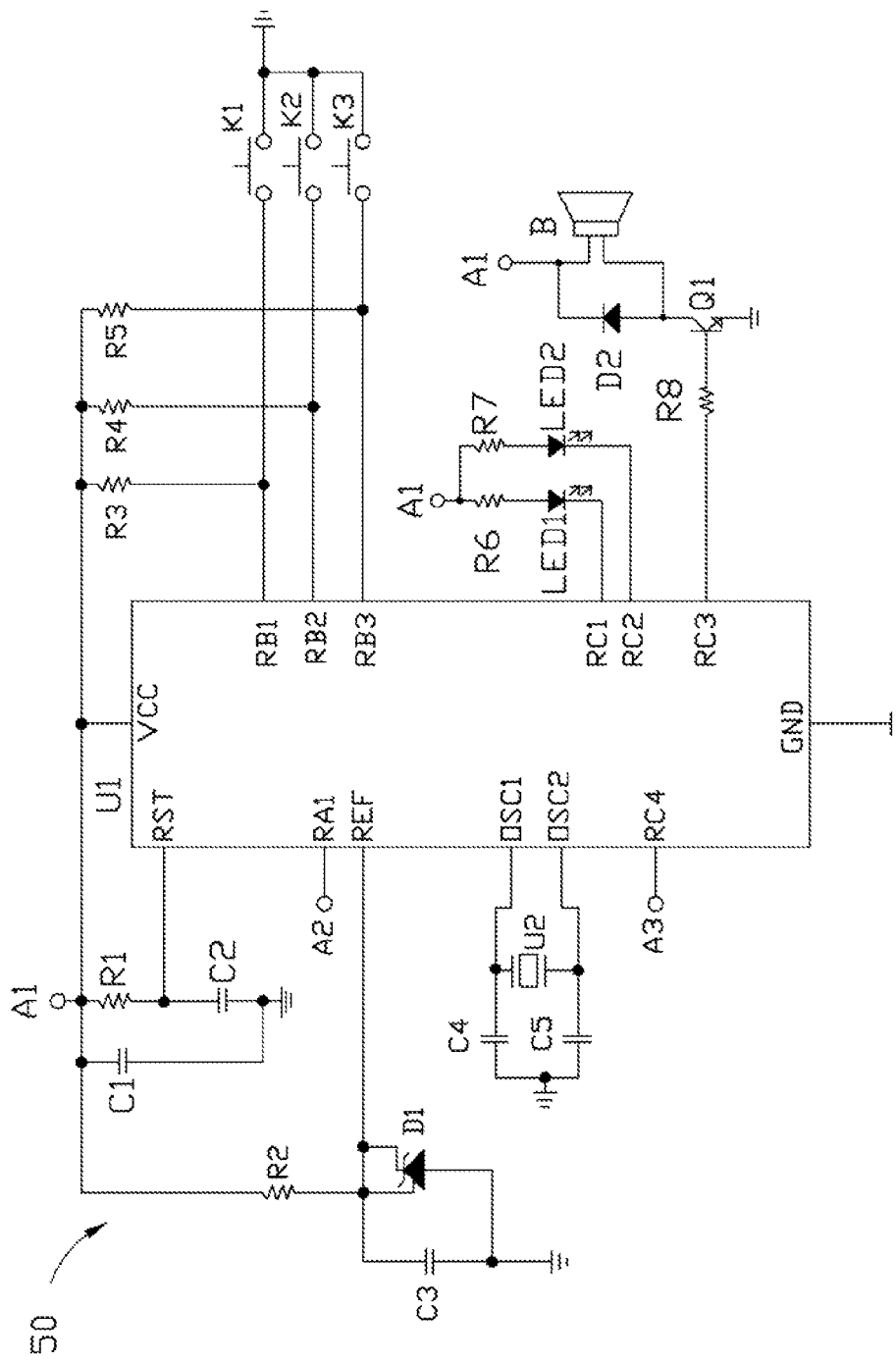
FIG. 2 is a circuit diagram of the control circuit of FIG. 1.

Referring to FIG. 2, the control circuit 50 includes a single chip U1, a crystal oscillator U2, a transistor Q1, a buzzer B, a three-terminal adjustable shunt regulator D1, a diode D2, a first light emitting diode LED1, a second light emitting diode LED2, a first switch K1, a second switch K2, a third switch K3, resistors R1-R8, and capacitors C1-C5. The first light emitting diode LED1 emits green light when the first light emitting diode LED 1 is turned on. The second light emitting diode LED2 emits red light when the second light emitting diode LED2 is turned on.

The single chip U1 is a PIC16C72 single chip. The single chip U1 includes a power terminal VCC, a ground terminal GND, a reset terminal RST, a reference voltage terminal REF, a clock input terminal OSC1, a clock output terminal OSC2, an A port RA1, three B ports RB1-RB3, four C ports RC1-RC4.

The power terminal VCC of the single chip U1 functions as the first terminal of the control circuit 50, and is coupled to the second terminal A1 of the buck circuit 40. The power terminal VCC is also grounded via the capacitor C1. The ground terminal GND of the single chip U1 is grounded.

The reset terminal RST of the single chip U1 is connected to the power terminal VCC of the single chip U1 via the resistor R1, and grounded via the capacitor C2. The reference voltage terminal REF is coupled to a cathode and a reference terminal of the three-terminal adjustable shunt regulator D1. An anode of the three-terminal adjustable shunt regulator D1 is grounded, and connected to the reference terminal of the three-terminal adjustable shunt regulator D1 via the capacitor C3. The reference terminal of the three-terminal adjustable shunt regulator D1 is connected to the power terminal VCC of the single chip U1 via the resistor R2.

The clock input terminal OSC1 of the single chip U1 is coupled to a first terminal of the crystal oscillator U2, and grounded via the capacitor C4. The clock output terminal OSC2 of the single chip U1 is coupled to a second terminal of the crystal oscillator U2, and grounded via the capacitor C5.

The A port RA1 of the single chip U1 functions as the second terminal of the control circuit 50, and is coupled to the second terminal A2 of the voltage divider circuit 30.

The B port RB1 of the single chip U1 is coupled to a first terminal of the first switch K1, and connected to the power terminal VCC of the single chip U1 via the resistor R3. A second terminal of the first switch K1 is grounded. The B port RB2 of the single chip U1 is coupled to a first terminal of the second switch K2, and connected to the power terminal VCC of the single chip U1 via the resistor R4. A second terminal of the second switch K2 is grounded. The B ports RB3 of the single chip U1 is coupled to a first terminal of the third switch K3, and connected to the power terminal VCC of the single chip U1 via the resistor R5. A second terminal of the third switch K3 is grounded.

The C port RC1 of the single chip U1 is coupled to a cathode of the first light emitting diode LED1. An anode of the first light emitting diode LED1 is connected to the second terminal A1 of the buck circuit 40 via the resistor R6. The C port RC2 of the single chip U1 is coupled to a cathode of the second light emitting diode LED2. An anode of the second light emitting diode LED2 is connected to the second terminal A1 of the buck circuit 40 via the resistor R7. The C port RC3 of the single chip U1 is connected to a base of the transistor Q1 via the resistor R8. A collector of the transistor Q1 is coupled to an anode of the diode D2 and a negative terminal of the buzzer B. An emitter of the transistor Q1 is grounded. A cathode of the diode D2 is coupled to the second terminal A1 of the buck circuit 40 and a positive terminal of the buzzer B. The C port RC4 of the single chip U1 functions as the third terminal of the control circuit 50, and is coupled to the first terminal A3 of the switch circuit 60.

Figure 3:
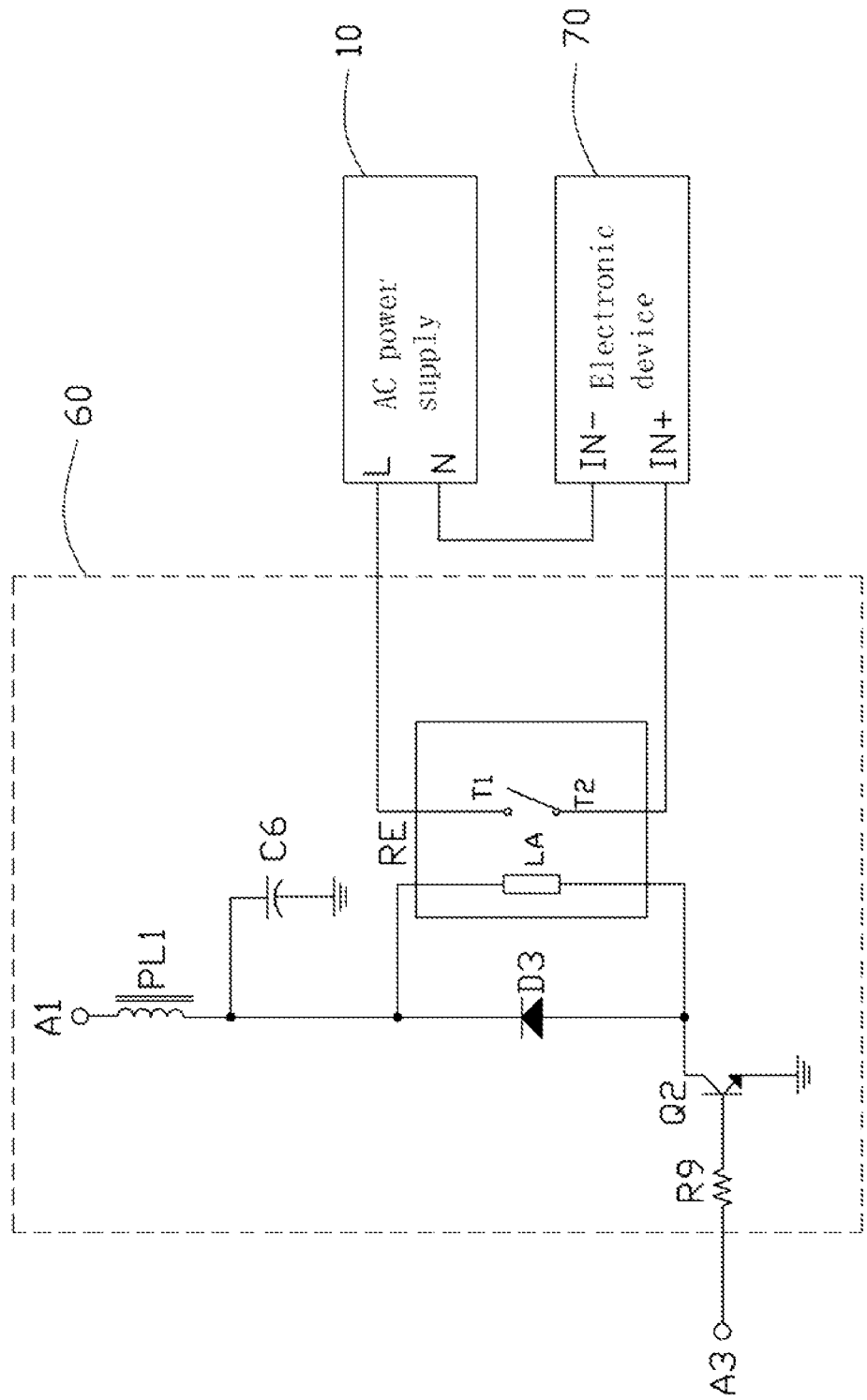
FIG. 3 is a circuit diagram of the switch circuit of FIG. 1, connected to the electronic device and the AC power supply.

Referring to FIG. 3, the switch circuit 60 includes a transistor Q2, a relay RE, a diode D3, an inductor PL1, a resistor R9, and a capacitor C6.

A first terminal of the resistor R9 functions as the first terminal A3 of the switch circuit 60, and is coupled to the C port RC4 of the single chip U1. A second terminal of the resistor R9 is coupled to a base of the transistor Q2. A collector of the transistor Q2 is coupled to an anode of the diode D3. An emitter of the transistor Q2 is grounded. A cathode of the diode D3 is coupled to a first terminal of the inductor PL1. A second terminal of the inductor PL1 functions as the fourth terminal of the switch circuit 60, and is coupled to the second terminal A1 of the buck circuit 40. The first terminal of the inductor PL1 is grounded via the capacitor C6.

The relay RE includes a coil LA, a first contact T1, and a second contact T2. A first terminal of the coil LA is coupled to the cathode of the diode D3. A second terminal of the coil LA is coupled to the anode of the diode D3. The first contact T1 of the relay RE functions as the second terminal of the switch circuit 60, and is coupled to a hot line L of the AC power supply 10. The second contact T2 of the relay RE functions as the third terminal of the switch circuit 60, and is coupled to a positive input IN+ of the electronic device 70. A ground line N of the AC power supply 10 is coupled to a negative input IN− of the electronic device 70. The first contact T1 contacts the second contact T2 in the presence of current through the coil LA. The first contact T1 does not contact the second contact T2 in the absence of current through the coil LA.

An enable signal of the single chip U1 is set at a low voltage level when the first switch K1 is turned on. The single chip U1 starts to work. The C port RC3 of the single chip U1 outputs a square signal lasting 20 seconds. The second DC voltage from the buck circuit 40 supplies power to the buzzer B. When the C port RC3 of the single chip U1 is at a high voltage level, the transistor Q1 is turned on. The buzzer B is activated. The buzzer B sends out an alarm signal for 20 seconds to remind a user to select a standard voltage. When the C port RC3 of the single chip U1 is at a low voltage level, the transistor Q1 is turned off. The buzzer B is deactivated.

The single chip U1 stores two voltage values and a voltage range: 110 volts(V), 220V, and 110V~220V voltage range.

When the second switch K2 is turned on, the 110V is selected as the standard voltage. When the third switch K3 is turned on, the 220V is selected as the standard voltage. When the second switch K2 and the third switch K3 are both turned off, the 110V~220V voltage range is selected as the standard voltage.

The A port RA1 of the single chip U1 detects the voltage of the first DC voltage via the voltage divider circuit 30. The single chip U1 compares the voltage of the first DC voltage with the standard voltage.

The single chip U1 also stores a predetermined voltage value. When the voltage of the first DC voltage is equal to the standard voltage or the difference between the voltage of the first DC voltage and the standard voltage is less than the predetermined voltage value, the C port RC1 of the single chip U1 is at a low voltage level. The first light emitting diode LED 1 is turned on and emits green light to indicate that the voltage of the AC power supply 10 matches the voltage rating of the electronic device 70. At the same time, the C port RC4 of the single chip U1 is at a high voltage level. The transistor Q2 is turned on. The first contact T1 of the relay RE contacts the second contact T2. The hot line L of the AC power supply 10 is coupled to the positive input IN+ of the electronic device 70.

When the difference between the voltage of the first DC voltage and the standard voltage is larger than the predetermined voltage value, the C port RC2 of the single chip U1 is at a low voltage level. The second light emitting diode LED2 is turned on and emits red light to indicate that the voltage of the AC power supply 10 does not match the voltage rating of the electronic device 70. At the same time, the C port RC4 of the single chip U1 is at a low voltage level. The transistor Q2 is turned off. There is no current passing through the coil LA. The first contact T1 of the relay RE does not contact the second contact T2. The hot line L of the AC power supply 10 is disconnected from the positive input IN+ of the electronic device 70.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power control system connected between an alternating current (AC) power supply and an electronic device, the power control system comprising:

a rectifier circuit, wherein a first terminal of the rectifier circuit is connected to the AC power supply, the rectifier circuit converts an alternating current signal of the AC power supply to a first direct current (DC) voltage;

a buck circuit, wherein a first terminal of the buck circuit is connected to a second terminal of the rectifier circuit, the buck circuit receives the first DC voltage and outputs a second DC voltage, the voltage of the second DC voltage is less than the voltage of the first DC voltage;

a voltage divider circuit, wherein a first terminal of the voltage divider circuit is connected to the second terminal of the rectifier circuit;

a control circuit, wherein a first terminal of the control circuit is connected to a second terminal of the buck circuit, a second terminal of the control circuit is connected to a second terminal of the voltage divider circuit, the control circuit detects the voltage of the first DC voltage via the voltage divider circuit and compares the voltage of the first DC voltage with a standard voltage and outputs a control signal with a third terminal; and a switch circuit, wherein a first terminal of the switch circuit is connected to the third terminal of the control circuit, a second terminal of the switch circuit is connected to the AC power supply, a third terminal of the switch circuit is connected to the electronic device, a fourth terminal of the switch circuit is connected to the second terminal of the buck circuit, the control circuit controls the switch circuit to connect the AC power supply to the electronic device according to the control signal of the control circuit.

2. The power control system of claim 1, wherein the rectifier circuit is a bridge type rectifier circuit.

3. The power control system of claim 1, wherein the control circuit comprises a single chip, a crystal oscillator, a three-terminal adjustable shunt regulator, first to third switches, the single chip comprises a power terminal, a ground terminal, a reset terminal, a reference voltage terminal, a clock input terminal, a clock output terminal, an A port, first to third B ports, and a first C port, the power terminal of the single chip functions as the first terminal of the control circuit and is coupled to the second terminal of the buck circuit, the ground terminal of the single chip is grounded, the reset terminal of the single chip is connected to the power terminal of the single chip via a first resistor, the reference voltage terminal is coupled to a cathode and a reference terminal of the three-terminal adjustable shunt regulator, an anode of the three-terminal adjustable shunt regulator is grounded and connected to the reference terminal of the three-terminal adjustable shunt regulator via a capacitor, the reference terminal of the three-terminal adjustable shunt regulator is connected to the power terminal of the single chip via a second resistor, the clock input terminal is coupled to a first terminal of the crystal oscillator, the clock output terminal is coupled to a second terminal of the crystal oscillator, the A port functions as the second terminal of the control circuit and is coupled to the second terminal of the voltage divider circuit, the first B port is grounded via the first switch and is connected to the power terminal via a third resistor, the second B port is grounded via the second switch and is connected to the power terminal via a fourth resistor, the third B port is grounded via the third switch and is connected to the power terminal via a fifth resistor, the first C port functions as the third terminal of the control circuit and is coupled to the first terminal of the switch circuit.

4. The power control system of claim 3, wherein the control circuit further comprises a transistor, a buzzer, and a diode, the single chip further comprises a second C port, the second C port is connected to a base of the transistor via a sixth resistor, a collector of the transistor is coupled to an anode of the diode and a negative terminal of the buzzer, an emitter of the transistor is grounded, a cathode of the diode is coupled to a positive terminal of the buzzer and the second terminal of the buck circuit.

5. The power control system of claim 3, wherein the control circuit further comprises a first light emitting diode and a second light emitting diode, the single chip further comprises a second C port and a third C port, the second C port is coupled to a cathode of the first light emitting diode, an anode of the first light emitting diode is connected to the second terminal of the buck circuit via a sixth resistor, the third C port is coupled to a cathode of the second light emitting diode, an anode of the second light emitting diode is connected to the second terminal of the buck circuit via a seventh resistor.

6. The power control system of claim 5, wherein the first light emitting diode emits green light when the first light emitting diode is turned on, the second light emitting diode emits red light when the second light emitting diode is turned on.

7. The power control system of claim 3, wherein the single chip stores two voltage values, a voltage range, and a predetermined voltage value, two of the first to third switches is used to select one of the voltage values or the voltage range as the standard voltage, the single chip compares the voltage of the first DC voltage and the standard voltage, when the difference between the voltage of the first DC voltage and the standard voltage is larger than the predetermined voltage value, the first C port of the single chip is at a low voltage level, the switch circuit disconnects the AC power supply from the electronic device.

8. The power control system of claim 1, wherein the switch circuit comprises a transistor, a relay, a diode, and an inductor, a base of the transistor is coupled to the third terminal of the control circuit, a collector of the transistor is coupled to an anode of the diode, an emitter of the transistor is grounded, a cathode of the diode is coupled to a first terminal of the inductor, a second terminal of the inductor is coupled to the second terminal of the buck circuit, the relay comprises a coil, a first contact, and a second contact, a first terminal of the coil is coupled to the cathode of the diode, a second terminal of the coil is coupled to the anode of the diode, the first contact is coupled to a hot line of the AC power supply, a second contact is coupled to a positive input of the electronic device, a ground line of the AC power supply is coupled to a negative input of the electronic device.

* * * * *